April 19, 1932.  G. DELAGE  1,854,330

METALLIC CONSTRUCTION OF AIRCRAFT

Filed Dec. 19, 1929  2 Sheets-Sheet 2

G. Delage
INVENTOR

By: Marks & Clark
Attys.

Patented Apr. 19, 1932

1,854,330

UNITED STATES PATENT OFFICE

GUSTAVE DELAGE, OF PARIS, FRANCE, ASSIGNOR TO SOCIETE ANONYME: NIEUPORT-ASTRA, OF SEINE, FRANCE

METALLIC CONSTRUCTION OF AIRCRAFT

Application filed December 19, 1929, Serial No. 415,322, and in France December 20, 1928.

The metallic construction of the hollow parts constituting aerofoils and, for instance, the wings of airplanes, leads to difficulties which, on the one hand, considerably increase the cost of construction and, on the other hand, do not afford the advantages of light weight.

The extreme thinness of the covering metal sheets reduces their resistance to compression stresses. Although these metal sheets constitute an important part of the whole weight; further, the aerodynamic displacements of the lifting power center on a wing in the various positions of flight, require the use of wing girders of large dimensions.

Finally, the manner of assembling the parts together and, particularly, the covering metal sheets, leads to serious difficulties from the fact that the aerofoils are hollow bodies the inner space of which is substantially inaccessible.

The invention has for its main object to remedy the above inconveniences. It permits reduction of the weight of the girders and the assemblage in a simple, practical and inexpensive manner.

Further, it utilizes the covering in such manner that it contributes to the solidity of the whole by withstanding an important part of the torsion stress imposed on the wing by the aerodynamic stress and termed in the art "aerodynamic torques".

The main object of the invention consists more particularly of an aerofoil, a wing, for instance, constituted by two main girders adapted to withstand the bending stress exerted upon the wing by the aerodynamic stress, regardless of the position of the lifting power center relatively to the leading edge, these two girders being connected by a system of stay members which includes the covering, in such a manner that stress applied locally to one of the girders, is transmitted to the other girder, in order the wing may effectively resist the various stresses to which it is subjected in flight.

The whole structure composed of the two girders so stayed, constitutes only a single box girder capable of resisting, on the one hand the bending stress exerted by the aerodynamic stresses and on the other hand, the twisting due to the displacement of these stresses.

The system of stay members above mentioned is constituted by transversely arranged girders, and a panel comprising the covering riveted upon the auxiliary longitudinal bearers and upon the ribs.

The invention includes also special means for assembling these panels, which means permit the assembling operations to be carried on from the exterior of the wing.

The accompanying drawings show, by way of example only, a form of construction of the improvements constituting the invention, and applied to an airplane wing.

The girders $a$ and $b$, are shown as being in the form of a double T, but they may be otherwise constructed. They are connected, at intervals, by stay members $c$ constructed in the same manner as the girders, of known members such as angle metal bars.

The girders $a$ and $b$ carry at their external edges, an angle bar $d$ intended to receive the edges of the covering metal sheets.

Upon the girders $a$ and $b$ are fastened the panels which constitute the covering, and, more particularly, the part of the covering comprised between the girders $a$ and $b$. These panels $e_1, e_2, e_3, e_4$ can be seen in Fig. 1.

The panels $e_1, e_2$ are shown after assembling, and the panel $e_3$ is shown during assembling work. The panel $e_4$ is in position and forms a part of the under side of the finished wing.

Figure 2:
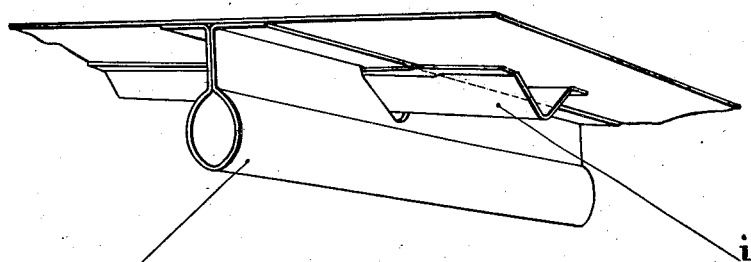
Figure 2 is a perspective view showing the crossing arrangement of an intermediary rib and an auxiliary longitudinal girder.

Each panel includes four different parts:
1°. The main ribs $f$ and $f'$, the form of which is adapted to that of the wing profile, are situated at each end of the panel.
2°. The auxiliary longitudinal girders $g$, the form of which is particularly shown Fig. 2, are of tubular form with T-shaped web and base portions which are riveted on the covering by the base portions.

3°. The covering h.

4°. The intermediary ribs i, shown Fig. 2, which are riveted upon the covering and insure the stiffness of the portions of the covering between the main ribs f.

The ribs i (Fig. 2) pass through notches provided in the web of the T-bar of the auxiliary longitudinal girders g. It is to be found that the ribs i pass through the web of the auxiliary longitudinal girder g, without necessitating notching the tubular part of the latter. Therefore the strength of the girder is not materially reduced by the passage of the ribs.

The whole of the panel e so constituted is compact and strong; it may be separately manufactured and entirely riveted by means of riveting machines, owing to the fact that all its parts are accessible.

Figure 3:
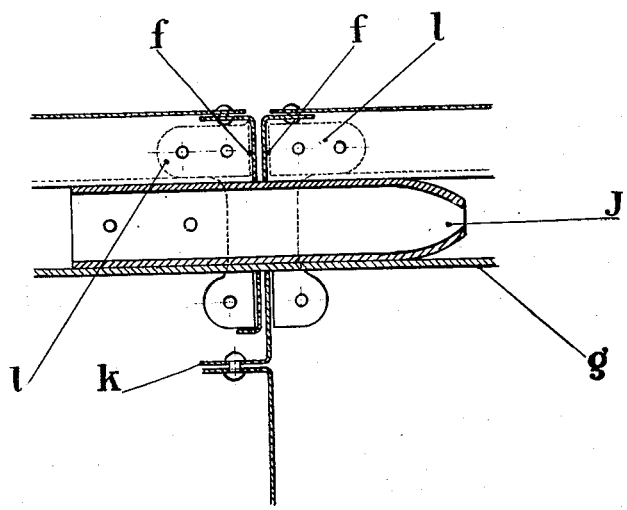
Figure 3 is a sectional view showing, on an enlarged scale, a detail of the device for the assemblage of the panels.

The auxiliary longitudinal girders g (Fig. 3) are provided at one end, with a tubular projecting member j fitted into the tubular part of the auxiliary girder g and suitably fastened to the same.

The tubes j are provided with tapered ends facilitating their introduction; these tubes serve also as tenons for assembling and holding panels together.

To put a panel in position, it is placed as shown at $e_3$ (Fig. 1) so that the tenons j are just opposite to the tubular parts of the auxiliary girders g of the panel e which has been previously placed in position.

Then, the panel $e_3$ is pushed so that the tenons j engage completely the auxiliary girders g.

It is only necessary to rivet, on the one hand, the edge k of the rib f on the edge of the stay c, and on the other hand, the ends of the covering h on the angle bars d carried by the girders a and b.

So secured and put in position, the panel $e_3$ is ready to receive the next following one.

The riveted joints provided, either at k, or at d, are external and accessible; they insure, on three sides, the perfect connection of the girders a and b with the covering, which is rendered stiff by adding the auxiliary longitudinal girders g and the intermediate ribs i. On the fourth side, the panel is connected to the auxiliary girders g by means of the tenons j of the preceding panel; this latter is strongly secured to the stay c and consequently to the girders a and b, by the medium, on the one hand, of the rib f' which supports the metal sheet and connects it to the auxiliary girders upon the side from which project the tenons j, and, on the other hand, through the medium of the rib f which bears against the rib f'. Both ribs are respectively connected to the auxiliary girders g by means of collar rings l riveted upon the latter.

The whole arrangement constituted by girders, stays and panels form a box girder which is capable of effectively withstanding bending and twisting stresses to which the wing is subjected.

The leading edge and the trailing edge are secured upon this box girder.

Figure 1:
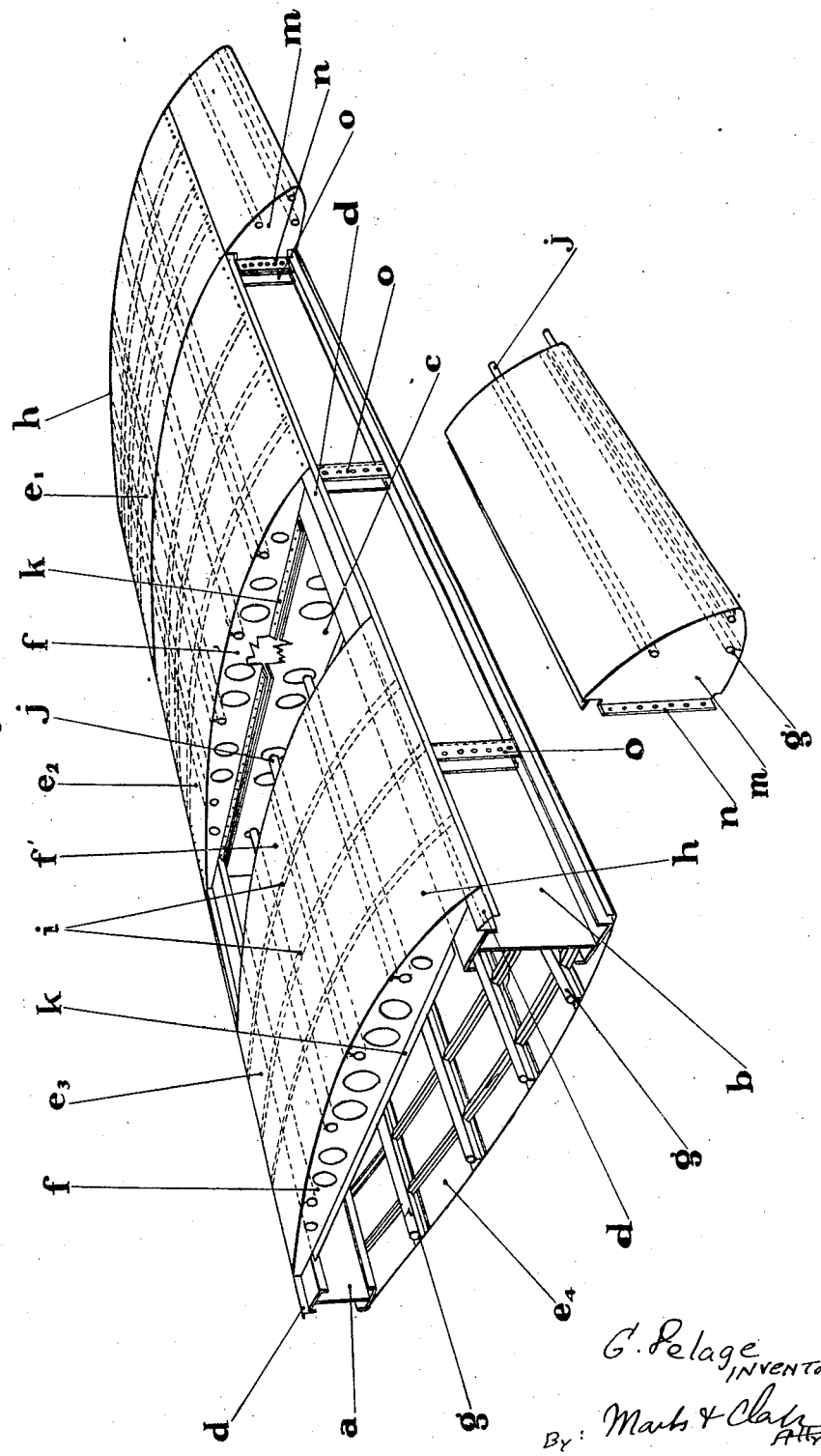
Figure 1 shows, in a perspective view, the whole of a wing during the assembling work.

In Fig. 1, the leading edge m only is shown; it is divided into parts the length of which is equal to the distance between two stays c.

Each part, separately manufactured, carries auxiliary longitudinal girders j identical to those of the panels; it enters the preceding one and is riveted upon the girder in front of the stay. For that purpose a folded edge n is provided which is secured by riveting to the flange of a U-strip, o, riveted upon the girder b; the riveting can be easily carried on from the exterior.

The trailing edge is assembled in the same manner to the girder a; it is constituted by parts identical to those of the leading edge.

The very simple mounting of the different parts of the wing, the possibility of manufacturing these parts in special workshops with all the conveniences afforded by independent manufacture of the several parts reduces the cost of production to a minimum.

What I claim as my invention and desire to secure by Letters Patent, is:—

1. In an airplane wing with metallic covering a central structure comprising two longitudinal girders braced by cross members forming box-elements, the outer wall of which consists of the central metallic covering of the wing, two cross-ribs forming the lateral walls of the said box-elements, the spacing of which corresponds to that of two adjacent cross members of the said central structure, a flange on one of the said ribs and adapted to be riveted to a cross member, a plurality of longitudinal tenons on one of the ribs of a box-element so that the securing of one box-element to an adjacent one is effected at one end by riveting the flange of a rib to a cross member, and at the other end by the engagement of the said tenons in complementary recesses formed in the adjacent box-element, fittings on the outer parts of the main longitudinal girders of the central structure, box-like elements the outer wall of which constitutes the covering of the rear and frontal edges of the wing, two lateral rigid walls or ribs of the said box-elements, a flange on one of the said ribs and adapted to be riveted to one of the former, longitudinal tenons on one of the said ribs so that the securing of one box-element is effected at one end by riveting and at the other end by the engagement of the said tenons in corresponding holes of the adjacent box-element.

2. In an airplane wing according to claim 1 box elements, the outer wall of which constitutes the central metallic covering or the covering of the leading edge and of the trailing edge of the wing, tubular spars and transverse ribs fixed to the inner surface of the wall of the box-element constituting the covering, a tenon fixed at one end of the said tubular spars, the distribution of the latter on the box-elements being such that the tenons of a box-element are adapted to engage with the tubular spars of the adjacent box-element.

3. In an airplane wing having a metallic covering, a central structure formed of a plurality of main box-elements each of which comprises a pair of main longitudinal girders, a plurality of auxiliary longitudinal girders, each provided with a longitudinal tenon which projects beyond the end of the main box-elements and a recess for receiving the projecting tenon of the adjacent longitudinal girder, a pair of cross-ribs on each end of the box members, a cross-stay member in alignment with each cross-rib, each cross-rib and its adjacent cross-stay adapted to form one of the ends of the box element, and means for securing the cross-ribs to the cross-stay members.

4. In an airplane wing having a metallic covering a central structure formed of a plurality of main box-elements each of which comprises a pair of main longitudinal girders, a plurality of auxiliary longitudinal girders, each provided with a longitudinal tenon which projects beyond the end of the main box-elements and a recess for receiving the projecting tenon of the adjacent longitudinal girder, a pair of cross-ribs on each end of the box members, a cross-stay member in alignment with each cross rib, each cross rib and its adjacent cross-stay adapted to form one of the ends of the box element, means for securing the cross-ribs to the cross-stay members, a box-like metallic covered element forming the frontal and the rear edge of each wing section comprising a lateral side rib having a plurality of tenons projecting therefrom, a second lateral rib having a complementary recess for the tenons therein, a flange on one cross-rib adapted to be riveted to a flange of the adjacent cross-rib and to the adjacent main girder, each edge section being thereby joined to its adjacent section by means of the interlocking tenons and their recesses, and the riveted connection between the edges of the lateral side ribs.

5. In an airplane wing composed of a series of adjacent box-elements, each adapted to be assembled as a unit before being fixed together to form the central structure of the wing comprising a pair of longitudinal main girders forming the sides of the box-elements, a pair of integrally joined cross-ribs and a stay member forming the ends of the box element, a metallic covering having stiffening means therefor forming the top and bottom of the box element, means for connecting adjacent sections comprising a plurality of tenons projecting from one section, into an adjacent section, and means for securing said tenons in the latter, and fourth means for connecting the sections comprising a pair of riveted flanges on each pair of main ribs and stay members.

In testimony whereof I have signed this specification.

GUSTAVE DELAGE.